(12) United States Patent
Fedorov

(10) Patent No.: US 9,002,412 B1
(45) Date of Patent: Apr. 7, 2015

(54) AUTOMATICALLY ACTIVATING HANDS-FREE MODE WHILE TRACKING SPEED

(71) Applicant: Intuit Inc., Mountain View, CA (US)

(72) Inventor: Boris A. Fedorov, San Francisco, CA (US)

(73) Assignee: Intuit Inc., Mountain View, CA (US)

(*) Notice: Subject to any disclaimer, the term of this patent is extended or adjusted under 35 U.S.C. 154(b) by 126 days.

(21) Appl. No.: 13/625,734

(22) Filed: Sep. 24, 2012

(51) Int. Cl.
*H04M 1/00* (2006.01)
*H04W 4/02* (2009.01)
*H04M 1/725* (2006.01)

(52) U.S. Cl.
CPC .......... *H04W 4/027* (2013.01); *H04M 2250/12* (2013.01); *H04M 1/72569* (2013.01)

(58) Field of Classification Search
CPC .................... H04M 1/72577; H04M 2250/12; H04M 2250/10; H04M 2250/74; H04M 1/6075; H04M 1/72538; H04M 1/6041; H04W 4/027; H04W 36/32; G10L 15/26; G10L 15/265

USPC ................................ 455/414.1, 569.1–569.2
See application file for complete search history.

(56) References Cited

U.S. PATENT DOCUMENTS

| | | | |
|---|---|---|---|
| 2010/0312547 A1* | 12/2010 | Van Os et al. ..................... 704/9 |
| 2011/0223893 A1* | 9/2011 | Lau et al. .................. 455/414.1 |
| 2012/0052907 A1* | 3/2012 | Gilbreath et al. .......... 455/556.1 |

* cited by examiner

*Primary Examiner* — George Eng
*Assistant Examiner* — Nam Huynh
(74) *Attorney, Agent, or Firm* — Park, Vaughan, Fleming & Dowler LLP; Eric Lin

(57) ABSTRACT

The disclosed embodiments relate to a system that enables a user to continue accomplishing a task on a handheld device while moving. During operation, the system tracks the speed of the handheld device while the user is interacting with an application on the device. If the speed is greater than a predetermined speed, the system audibly prompts the user to enable hands-free mode. If the user says yes, the system enables hands-free mode and the user may continue to use the application in hands-free mode. Otherwise, the system continues to run the application without enabling hands-free mode.

17 Claims, 3 Drawing Sheets

AUTOMATICALLY ACTIVATING HANDS-FREE MODE WHILE TRACKING SPEED

BACKGROUND

Related Art

Mobile applications found on handheld devices, such as smartphones, allow users to accomplish tasks away from the desk and outside the office. By interacting with the device's touch screen interface and/or keyboard, users are able to submit payroll entries, send invoices, and check accounts payable during flights and in between appointments. If users could also accomplish these tasks while driving, they would save even more time. However, users who drive while using a handheld device may pose a danger to others nearby.

Three out of four states in the U.S. have introduced "hands-free" laws. Hands-free laws generally prohibit the driver of a vehicle from interacting with a handheld device by hand. These laws stem from the commonly accepted idea that a driver should focus her hands and eyes on the road and not on a handheld device. Otherwise, the driver may devote too little attention to the road and eventually cause an accident. To circumvent this problem, many handheld devices offer the user an option to use applications in hands-free mode.

However, users may not be using hands-free mode as often as they should. In some cases, users may not know how to activate hands-free mode. In other cases, users may find it too much trouble to navigate the menus on the device to activate hands-free mode. In either case, the user has two choices that are both less than ideal: (1) they can wait until after the trip to finish the task; or (2) they can use the device by hand during the trip. The first choice is inefficient; the second choice is dangerous.

SUMMARY

The disclosed embodiments relate to a system that enables a user to continue accomplishing a task on a handheld device while moving. During operation, the system tracks the speed of the handheld device while the user is interacting with an application on the device. If the speed is greater than a predetermined speed, the system audibly prompts the user to enable hands-free mode. If the user says yes, the system enables hands-free mode and the user may continue to use the application in hands-free mode. Otherwise, the system continues to run the application without enabling hands-free mode.

Instruments found on contemporary handheld devices offer different ways to track the speed of the device. In some embodiments, the system tracks the speed by calculating the speed from acceleration data gained from an accelerometer in the handheld device.

In some embodiments, the system tracks the speed of the handheld device by calculating the speed from location data gained from a Global Positioning System (GPS) receiver in the handheld device.

In some embodiments, prompting the user to activate an application's hands-free mode may comprise presenting the user with a voice prompt.

Note that before the enablement of hands-free mode, the user may be accomplishing a task on the handheld device by completing fields in the application. Additionally, the hands-free mode may allow the user to complete each of these fields without the use of her hands or any tactile input.

Furthermore, completing each field in the application without the use of hands may comprise a number of steps that differ from completing each field in the application with the use of hands. In some embodiments, the system performs at least some of the following steps for each field: First, the system selects the field. Then, the system audibly communicates the field's name to the user. Next, the system audibly instructs the user to speak a value for the field. Next, the system listens for the user's vocal input. The system then converts the received input into a text value. Next, the system audibly communicates the converted text value back to the user and listens for the user's vocal confirmation that the text value is correct. Finally, if the text value is correct, the system enters the text value into the field.

Note that the system may receive a command from the user to disable tracking the speed of the handheld device. In response to this command, the system may disable tracking the speed of the handheld device.

Note that embodiments of the invention may be implemented as an independent service that exists in the device's operating system. Independent applications that reside on the device would then make calls to the service in order to access the features provided by embodiments of the invention.

DETAILED DESCRIPTION

Figure 1:
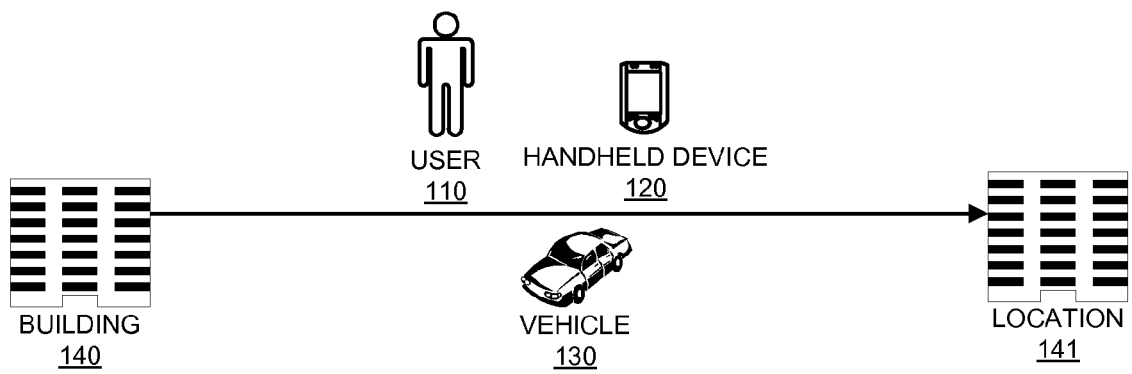
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

By utilizing accelerometers and natural language processing (NLP) libraries, embodiments of the present invention enable an application, which executes on a handheld device, to track the speed of the device and, in response to exceeding a pre-determined speed, prompt the user to activate hands-free mode. After agreeing to activate hands-free mode, the user can then continue using the device in hands-free mode.

Embodiments of the present invention provide various advantages. For example, by encouraging the user to activate hands-free mode, embodiments of the present invention reduce the chance that the user drives a vehicle while using her hands to interact with a handheld device. This, in turn, reduces the risk of an automobile accident. Without embodiments of the present invention, users may find it too troublesome to navigate menus on the device to enable hands-free mode. In other cases, users may not know about hands-free mode or may not know how to enable hands-free mode. In either case, users may decide to risk driving while using the device by hand, increasing the chance of a vehicle accident.

Note that the aforementioned advantages increases in states that have passed hands-free laws that restrict drivers from manually accessing handheld devices while driving. By automatically prompting users to enable hands-free mode, embodiments of the present invention help users follow the law.

The disclosed embodiments relate to a system that enables a user to continue accomplishing a task on a handheld device while moving. During operation, the system tracks the speed of the handheld device while the user is interacting with an application on the device. If the speed is greater than a pre-determined speed, the system audibly prompts the user to enable hands-free mode. If the user says yes, the system enables hands-free mode and the user may continue to use the application in hands-free mode. Otherwise, the system continues to run the application without enabling hands-free mode. Note that the type of task may include submitting a payroll entry, sending an invoice or checking accounts payable.

Instruments found on contemporary handheld devices offer different ways to track the speed of the device. In some embodiments, the system tracks the speed by calculating the speed from acceleration data gained from an accelerometer. Note that the handheld device may incorporate the accelerometer. Ways to calculate the current speed of the device with an accelerometer include, but are not limited to, tracking the acceleration of the vehicle over short intervals of time and then calculating the speed by summing the products of the intervals and their respective acceleration values.

In some embodiments, the system tracks the speed of the handheld device by calculating the speed from location data gained from a Global Positioning System (GPS) receiver. Note that the handheld device may incorporate a GPS receiver. Ways to calculate the current speed of the device with a GPS receiver include, but are not limited to, tracking the location of the car across short intervals of time and then calculating the speed by dividing the change's distance by the change's time.

In some embodiments, prompting the user to activate an application's hands-free mode may comprise presenting the user with a voice prompt. For example, consider a situation where a user is unable to finish submitting payroll entries on a handheld device before she needs to drive to a meeting. The user enters a car and begins to drive while keeping the handheld device in close proximity. When the handheld device recognizes that the traveling speed of the device is faster than a pre-determined speed, the device may audibly prompt the user with the following sentence, "Would you like to continue submitting payroll in hands-free mode?" The user may answer "yes" or "no" to this prompt.

Note that before the enablement of hands-free mode, the user may be accomplishing a task on the handheld device by completing fields in the application. Additionally, the hands-free mode may allow the user to complete each of these fields without the use of her hands or any tactile input.

Furthermore, completing each field in the application without the use of hands may comprise a number of steps that differ from completing each field in the application with the use of hands. In some embodiments, the system performs the following steps for each field: First, the system selects the field. Then, the system audibly communicates the field's name to the user. Next, the system audibly instructs the user to speak a value for the field. Next, the system listens for the user's vocal input. The system then converts the received input into a text value. Next, the system audibly communicates the converted text value back to the user and listens for the user's vocal confirmation that the text value is correct. Finally, if the text value is correct, the system enters the text value into the field.

Continuing from the above example, if the user answers "yes" to the above prompt, the system enables hands-free mode to help the user enter payroll entries without the use of her hands. To start a payroll entry, the system may audibly communicate the following to the user: "State the name of the employee you would like to submit payroll for." The user may then respond with the name "Bob." The system may then enter "Bob" into the name field. The system may then proceed to the next field: "number of hours." The system may then audibly communicate, "State the number of hours." The user may then respond with "40 hours." Note that for each field the system may utilize an NLP library such as Lingpipe or OpenNLP to decode the user's vocalizations and to communicate audible output back to the user. Note that the NLP library may use a predefined set of criteria to determine whether the user's vocal response matches the field's category. Returning to the above example, the system may recognize the word "hours" in the user's response "40 hours" and deduce that the word before "hours" should be a number." The system may then determine whether that word corresponds to a number. If not, the system may audibly request the user to clarify her response. Otherwise, the system may be certain, with a high level of confidence, that the user responded correctly and may enter "40 hours" into the field. Note that the system may audibly communicate "40 hours" back to the user and then prompt the user to confirm that the value is correct. The system repeats this process for each field until the user finishes her task.

Note that the system may receive a command from the user to disable tracking the speed of the handheld device. In response to this command, the system may disable tracking the speed of the handheld device. Note that, by disabling the tracking of the device's speed, the user may prevent the device from ever prompting her when the device's speed passes the pre-determined speed. Note that the prompting may not occur when the application is closed. However, note that the prompting may occur when the application is running in the background.

Note that embodiments of the invention may be implemented as an independent service that exists in the device's operating system. Independent applications that reside on the device would then make calls to the service in order to provide the other features of the invention to the user. Note that embodiments of the present invention may exist as a service that lies on top of the handheld device's operating system but independent of any applications installed in the device. Note that applications on the device may invoke the service's application programming interface (API) in order to perform functions that may include, but are not limited to: (1) passing audio input to the service where the service may utilize an NLP library to help process the input, (2) retrieving the output of the processed input, and (3) retrieving the current speed of the handheld device.

Computing Environment

FIG. 1 illustrates the computing environment 100 of a device user 110 in accordance with an embodiment of the present invention. Computing environment 100 includes a number of computer systems, which can include any type of computer system based on a microprocessor, a mainframe computer, a digital signal processor, a portable computing device, a personal organizer, a device controller, or a computational engine within an appliance. More specifically, referring to FIG. 1, computing environment 100 includes user 110, handheld device 120, vehicle 130, and locations 140-141.

Handheld device 120 may include any handheld device that includes computational capability such as PDAs, tablet computers, laptops, smartphones, cell phones, and other handheld computers.

User 110 can include an individual; a group of individuals; an organization; a group of organizations; a computing system; a group of computing systems or any other entity that can interact with computing environment 100.

Vehicle 130 can include any sort of vehicle that requires a substantial amount of the user's attention to drive or pilot including, but not limited to, cars, trucks, bicycles, boats, planes, and helicopters.

Locations 140-141 can include any location that user 110 needs to travel to including, but not limited to, homes, train stations, airports, restaurants, and offices.

Note that different embodiments of the present invention may use different system configurations, and are not limited to the system configuration illustrated in computing environment 100.

System

Figure 2:
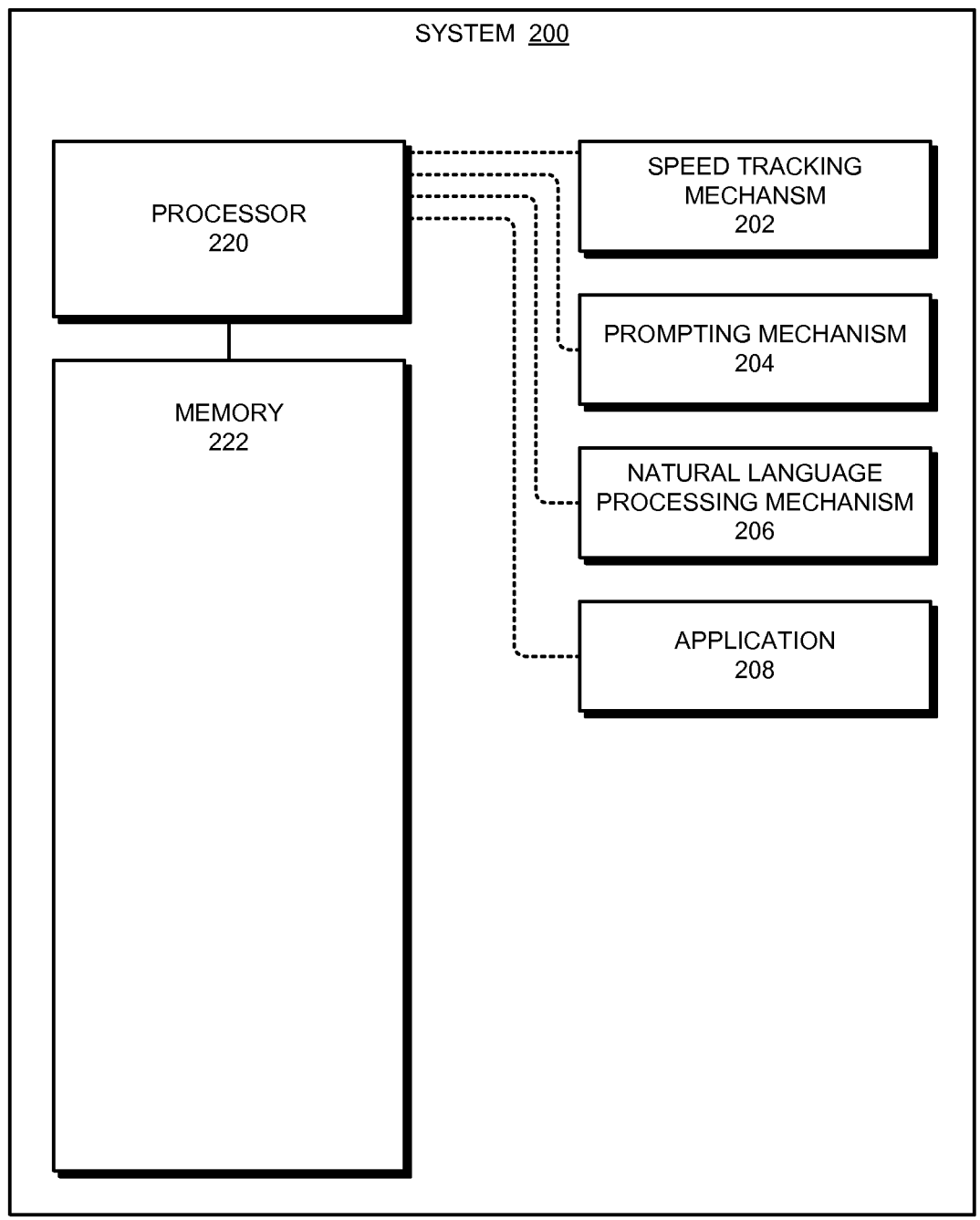
FIG. 2 illustrates a system in accordance with an embodiment of the present invention.

FIG. 2 illustrates a system 200 in accordance with an embodiment of the present invention. As illustrated in FIG. 1, system 200 can comprise handheld device 120. System 200 can also include speed-tracking mechanism 202, prompting mechanism 204, natural language processing (NLP) mechanism 206, application 208, processor 220, and memory 222.

Automatically Activating Hands-Free Mode while Tracking Speed

Figure 3:
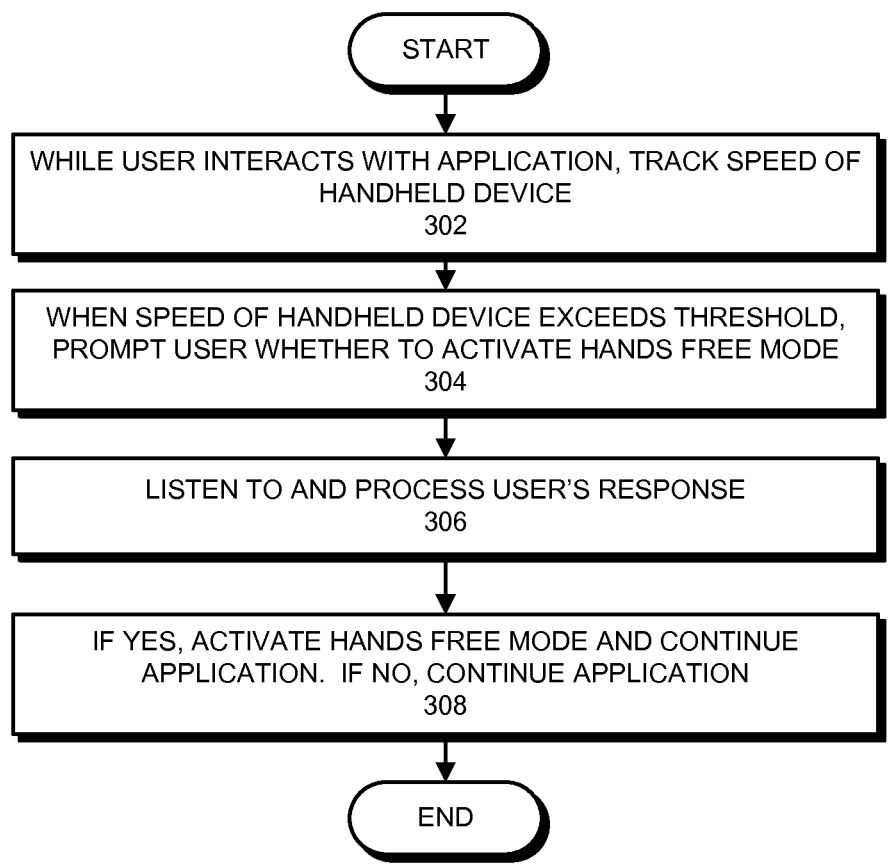
FIG. 3 presents a flow chart illustrating the process of automatically activating hands-free mode while tracking speed in accordance with an embodiment of the present invention.

FIG. 3 presents a flow chart illustrating the process of automatically activating an application's hands-free mode when the handheld device's speed has surpassed a pre-determined speed.

During operation, the system constantly tracks the speed of a handheld device while a user is interacting with an application installed on the device (operation 302). For example, suppose user 110, who is currently located at location 140, which is her office, is sending invoices via application 208 on handheld device 120, which is an accelerometer-equipped smartphone. While user 110 is engaged in this task, speed-tracking mechanism 202 may constantly query the accelerometer to calculate device 120's current speed. Because user 110 is not driving a vehicle, device 120's speed is not above the pre-determined speed, which is 15 mph in this example. Thus, in this case, prompting mechanism 204 does not prompt the user to activate hands-free mode.

Next, once the speed of the handheld device exceeds a pre-determined speed, the system may prompt the user to activate hands-free mode (operation 304). Returning to the above example, suppose user 110 has not finished sending invoices on device 120 when she is interrupted by a need to travel to a meeting with a client at location 141. User 110 enters vehicle 130 and begins driving from location 140 to location 141 with device 120 on vehicle 130's dashboard. As user 110 accelerates vehicle 130 beyond 15 mph, device 120, which has been tracking device 120's speed all this time, detects via the accelerometer that device 120's speed has exceeded the pre-determined speed of 15 mph. As a result, prompting mechanism 204 audibly prompts the user to activate hands-free mode.

Next, the system listens to the user's response and processes the response (operation 306). Returning to the above example, device 120 expects user 110 to respond to the prompt with a yes or no answer. Device 120 listens to user 110's response and sends the response as audio input to NLP mechanism 206. NLP mechanism 206 processes the audio input and attempts to determine whether the response is "yes" or "no". If NLP mechanism 206 is unable to do so, prompting mechanism 204 may prompt user 110 to repeat her response.

Finally, depending on the user's response, the system activates hands-free mode or continues running the application as before (operation 308). Note that ways in which the system decides when the system may prompt the user again include, but are not limited to, after a set time interval, the next time the device's speed exceeds the pre-determined speed, after the user restarts the application, and after the user reboots the device. Returning to the above example, if user 110 says "yes" in response to the prompt, device 120 activates hands-free mode. If user 110 says "no" in response to the prompt, device 120 does nothing and user 110 is free to continue using her hands to interact with application 208.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for enabling a user to continue to accomplish a task while moving, the method comprising:
   while a user is interacting with an application on a handheld device in a tactile fashion, tracking a speed of the handheld device;
   if the speed is greater than a pre-determined speed, prompting the user to ask whether the user wants to activate a hands-free mode for the application;
   if the user activates the hands-free mode, running the application in hands-free mode wherein doing so comprises:
      completing fields for a task in the application with vocal input from the user by:
         automatically selecting a first field;
         audibly communicating the first field's name to the user;

listening for the user's vocal input;
converting the input to a text value; and
entering the text into the first field;
if the user does not activate the hands-free mode, continuing to run the application in non-hands-free mode.

2. The computer-implemented method of claim 1, wherein tracking the speed comprises calculating the speed using an accelerometer.

3. The computer-implemented method of claim 1, wherein tracking the speed comprises calculating the speed using a GPS receiver.

4. The computer-implemented method of claim 1, wherein prompting the user to activate a hands-free mode for the application comprises presenting the user with an audible prompt.

5. The computer-implemented method of claim 1, further comprising receiving a command to disable tracking the speed of the handheld device, and in response to the command, disabling tracking the speed of the handheld device.

6. The computer-implemented method of claim 1, wherein:
the method is implemented as an independent service; and
independent applications make calls to the service.

7. A non-transitory computer-program product for use in conjunction with a computer system, the computer-program product comprising a computer-readable storage medium and a computer-program mechanism embedded therein for configuring the computer system to enable a user to continue to accomplish a task while moving, the computer-program mechanism including:
   instructions for, while a user is interacting with an application on a handheld device in a tactile fashion, tracking a speed of the handheld device;
   instructions for, if the speed is greater than a pre-determined speed, prompting the user to ask whether the user wants to activate a hands-free mode for the application;
   instructions for, if the user activates the hands-free mode, running the application in hands-free mode wherein doing so comprises:
      completing fields for a task in the application with vocal input from the user by:
         automatically selecting a first field;
         audibly communicating the first field's name to the user;
         listening for the user's vocal input;
         converting the input to a text value; and
         entering the text into the first field
   instructions for, if the user does not activate the hands-free mode, continuing to run the application in non-hands-free mode.

8. The computer-program product of claim 7, wherein tracking the speed comprises calculating the speed using an accelerometer.

9. The computer-program product of claim 7, wherein tracking the speed comprises calculating the speed using a GPS receiver.

10. The computer-program product of claim 7, wherein prompting the user to activate a hands-free mode for the application comprises presenting the user with an audible prompt.

11. The computer-program product of claim 7, wherein the computer-program mechanism further includes instructions for receiving a command to disable tracking the speed of the handheld device, and in response to the command, disabling tracking the speed of the handheld device.

12. The computer-program product of claim 7, wherein:
the computer-program mechanism is implemented as an independent service; and
independent applications make calls to the service.

13. A computer system, comprising:
a processor;
memory; and
a program module, wherein the program module is stored in the memory and configured to be executed by the processor, the program module including instructions for enabling a user to continue to accomplish a task while moving, wherein the instructions include:
   instructions for, while a user is interacting with an application on a handheld device in a tactile fashion, tracking a speed of the handheld device;
   instructions for, if the speed is greater than a pre-determined speed, prompting the user to ask whether the user wants to activate a hands-free mode for the application;
   instructions for, if the user activates the hands-free mode, running the application in hands-free mode wherein doing so comprises:
      completing fields for a task in the application with vocal input from the user by:
         automatically selecting a first field;
         audibly communicating the first field's name to the user;
         listening for the user's vocal input;
         converting the input to a text value; and
         entering the text into the first field
   instructions for, if the user does not activate the hands-free mode, continuing to run the application in non-hands-free mode.

14. The computer system of claim 13, wherein tracking the speed comprises calculating the speed using an accelerometer.

15. The computer system of claim 13, wherein tracking the speed comprises calculating the speed using a GPS receiver.

16. The computer system of claim 13, wherein prompting the user to activate a hands-free mode for the application comprises presenting the user with an audible prompt.

17. The computer system of claim 13, wherein the instructions further include instructions for receiving a command to disable tracking the speed of the handheld device, and in response to the command, disabling tracking the speed of the handheld device.

* * * * *